(12) United States Patent  (10) Patent No.: US 7,843,576 B2
Haglof  (45) Date of Patent: Nov. 30, 2010

(54) MEANS FOR MEASURING A DIAMETER

(75) Inventor: Stefan Haglof, Helgum (SE)

(73) Assignee: Haglof Sweden AB, Langsele (SE)

( * ) Notice: Subject to any disclaimer, the term of this patent is extended or adjusted under 35 U.S.C. 154(b) by 259 days.

(21) Appl. No.: 11/910,640

(22) PCT Filed: Mar. 28, 2006

(86) PCT No.: PCT/SE2006/050045

§ 371 (c)(1),
(2), (4) Date: Oct. 4, 2007

(87) PCT Pub. No.: WO2006/107265

PCT Pub. Date: Oct. 12, 2006

(65) Prior Publication Data

US 2008/0158573 A1   Jul. 3, 2008

(30) Foreign Application Priority Data

Apr. 5, 2005  (SE) .................................. 0500748

(51) Int. Cl.
*G01B 11/14* (2006.01)
(52) U.S. Cl. ................................... 356/635
(58) Field of Classification Search ............. None
See application file for complete search history.

(56) References Cited

U.S. PATENT DOCUMENTS 3,749,500 A   7/1973   Carlson et al.
5,457,635 A   10/1995  Scott

FOREIGN PATENT DOCUMENTS

DE   100 32 362 A1   1/2002
DE   101 54 978 A1   5/2003
JP   11-166826       6/1999
WO   WO92/14116      8/1992

*Primary Examiner*—Gregory J Toatley
*Assistant Examiner*—Amanda H Merlino
(74) *Attorney, Agent, or Firm*—Young & Thompson

(57) ABSTRACT

A diameter measuring instrument that comprises a straightedge and two legs or jaws, wherewith the distance between the legs can be read-off. The invention is characterized in that the straightedge (2) is provided with a leg (3) which is fixed in relation to the straightedge and a leg (4) which is movable relative to the straightedge, or alternatively with two legs that are movable relative to the straightedge; in that each leg (3, 4) includes a laser (5, 6) which is designed to emit a visible laser beam (7, 8) in a direction that coincides with the length direction of respective legs (3, 4); and in that the laser beams (7, 8) are parallel to one another.

9 Claims, 1 Drawing Sheet

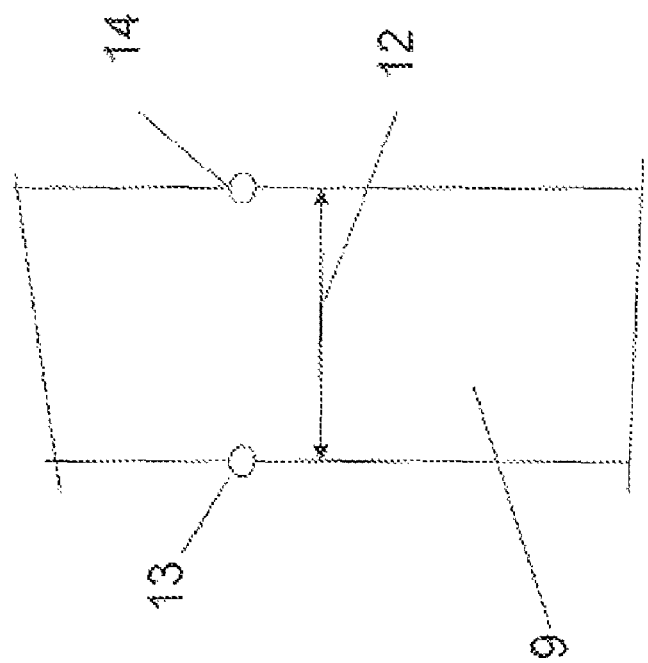
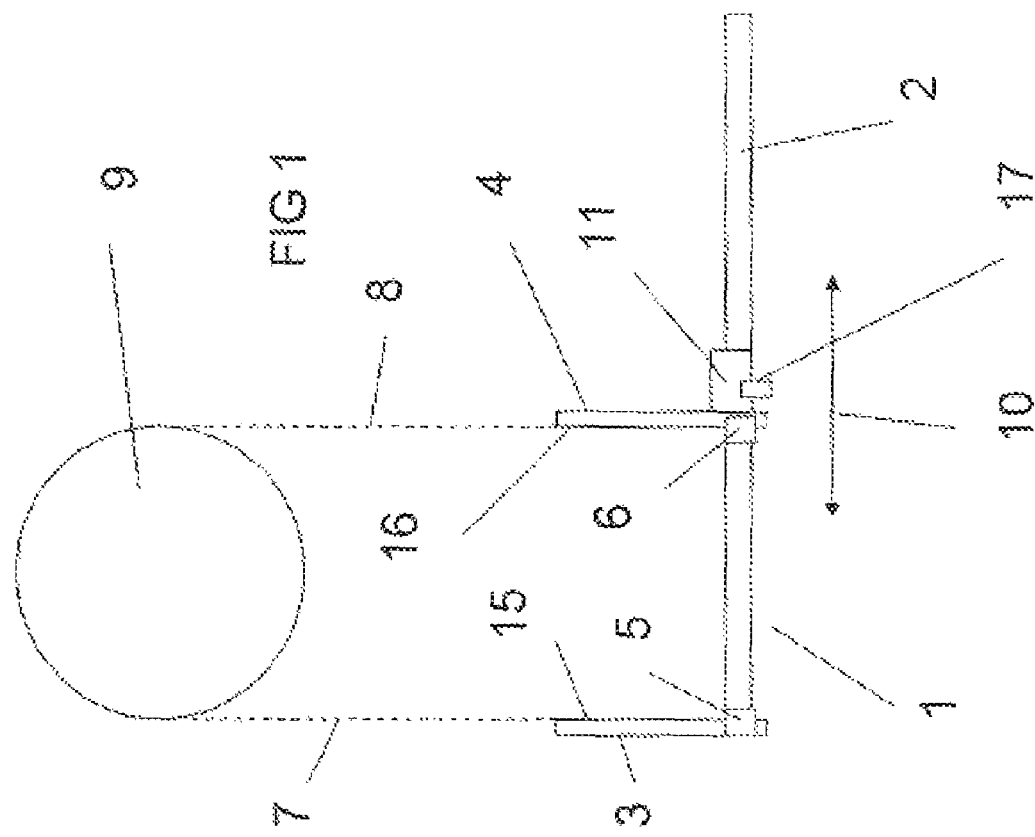

MEANS FOR MEASURING A DIAMETER

BACKGROUND OF THE INVENTION

1. Filed of the Invention

The present invention relates to a diameter measuring instrument. Although the subject of the present invention can be used to effect all types of measurements, it is primarily intended for measuring the diameter of tree trunks.

2. Description of the Related Art

Forest surveys are normally carried out by measuring a number of trees within a defined area. The diameters of these trees are measured some meter up along respective trunks, with the aid of so called measuring callipers that include two legs or jaws of which one is affixed relative to a straightedge or rule and the other is movable there along. The type of wood is also noted. Such callipers are described, for instance, in Swedish patent specification 0103099-8. These callipers include means for reading the position of the movable leg along the straightedge electronically. When the calliper legs have been moved into abutment with the tree trunk on mutually opposite sides thereof, the measured diameter of the trunk is stored in an electronic memory included in the callipers.

In the case of certain applications it is beneficial to measure the diameter of a tree trunk at a distance up along the trunk. Such a position is immediately beneath a so-called green crown limit on the trunk. The green crown limit is the place where the tree has green twigs all around the trunk. It is also normally desirous to determine the profile or conicity of the trunk. In order to carry out measurements of this nature it is necessary for a person to climb up the tree or up a ladder in order to enable the measurement to be carried out. The measuring process is thus awkward and time consuming.

When measuring, e.g., trees in areas that are not readily accessed or are impenetrable, such as areas in the USA in which the undergrowth is very difficultly forced and can include very thorny bushes among other things, the task of coming close to trees and measuring the diameter of their trunks is both awkward and time consuming.

SUMMARY OF THE INVENTION

These problems are avoided by means of the present invention, which provides an instrument that enables the diameter of a tree to be measured at different heights above the ground and at a distance from the tree.

The present invention thus relates to a diameter measuring instrument that includes a straightedge and two legs or jaws, with which the distance between the legs can be read-off. The inventive instrument is characterized in that the straightedge includes a leg which is fixed in relation to the straightedge and a leg which is movable in relation thereto, or, alternatively, two legs which are movable relative to the straightedge, in that each leg is provided with a laser that is designed to emit a visible laser beam in a direction that is coincidental with the length direction of respective legs and in that the laser beams are mutually parallel.

The invention will now be described in more detail partly with reference to an exemplifying embodiment thereof illustrated in the accompanying drawings, in which

BRIEF DESCRIPTION OF THE DRAWING FIGURES

FIG. 1 illustrates schematically a pair of callipers with which the present invention is applied; and FIG. 2 illustrates schematically a tree trunk whose diameter is being measured.

DETAILED DESCRIPTION OF THE INVENTION

FIG. 1 illustrates an inventive diameter measuring instrument. The instrument 1 includes a straightedge 2 provided with a leg or jaw 3 which is fixed in relation to the straightedge, and a leg or jaw 4 which is movable relative to the straightedge, where the distance between the legs can be read-off. Alternatively, both legs may be movable relative to the straightedge. FIG. 1 thus illustrates the instrument as a known pair of callipers 1 adapted for measuring the diameter of a tree trunk.

According to one preferred embodiment of the invention, the callipers 1 include an electronic circuit 11 which has a memory and at least one entering key 17 which, when depressed, causes the prevailing distance between the legs 3,4 to be stored in the memory of said instrument. The position of the leg or the legs along the straightedge is determined by means of a device known per se, such as a capacitive device or some other appropriate known device.

According to the invention, each leg 3,4 is provided with a laser 5, 6 which is designed to emit a visible laser beam 7, 8 in a direction that coincides with the length direction of respective legs 3, 4. The laser beams 7, 8 are also mutually parallel.

The one of the lasers 6 that is fixed to the movable leg 4 will, of course, accompany the leg 4 as it moves along the straightedge 2, as indicated by the arrow 10.

According to one preferred embodiment of the invention, each of the above lasers is a class 1 type laser, i.e. an eye-true laser.

According to one preferred embodiment of the invention each laser 5,6 is designed to emit a visible green light. Green light can be seen much more readily on the bark of a tree trunk than, for instance, a red light. However, colours other than green may be used.

According to one preferred embodiment of the invention each laser 5,6 is designed to emit a laser beam in a plane that coincides with that side 15, 16 of respective legs 3,4 that faces towards the opposing leg.

The instrument is used by holding the callipers so that the legs will face towards a tree whose diameter shall be measured. The person using the instrument will then move the movable leg to a position in which each laser beam irradiates outer parts of the tree trunk, i.e. in a direction so as to be tangential to the outer barrels surface of the tree trunk. This person will therewith see a green dot 13, 14 on respective sides of the tree trunk 9, as shown in FIG. 2. The distance between the legs 3, 4 will then be essentially the same as the distance between the dots 13, 14, i.e. equalling the diameter 12 of the tree trunk.

The distance measured between the callipers is stored in the memory of the electronic circuit 11 by pressing the button associated with said circuit.

The diameter of a tree trunk can be measured at any selected height, by angling the callipers upwards. This obviates the necessity of climbing up the tree or using ladders in order to measure the diameter of a trunk at heights greater than those that can be reached by a person standing on the ground.

As will be readily be understood, the diameter of a tree trunk can be measured while positioned at a distance from the tree concerned.

The present invention thus enables a tree to be measured quickly and with great precision.

It will be understood that the present invention is not restricted solely to the measuring of tree trunk-diameters. The invention can be used equally as well to measure the diameters of other objects, such as chimney stacks and other structural objects. Another field of application concerns the recorded measurement of fish and crustaceans, which are often measured regularly in connection with marine biological mapping operations.

It will also be understood that the structural design of the callipers 1 may be varied and adapted to suit the application concerned.

Consequently, the present invention shall not be considered limited to the above exemplifying embodiments thereof, since variations and modifications can be made within the scope of the accompanying claims.

The invention claimed is:

1. A hand-held diameter measuring instrument that comprises:
    a straightedge;
    a first leg or jaw that can be fixed or movable relative to the straightedge;
    a second leg or jaw that is movable relative to the straightedge; and
    an electronic circuit provided with a memory arranged to store measured diameters and the electronic circuit is arranged to store diameters at different heights up along a trunk of a tree when measured, whereby conicity of the trunk is stored,
    wherein each leg or jaw includes a laser which is designed to emit a visible laser beam in a direction that coincides with a length direction of the respective first or second legs or jaws, and in that the laser beams are parallel to one another.

2. The instrument according to claim 1, wherein each laser is designed to emit said laser beam in a plane that coincides with that side of the respective leg or jaw that faces towards the opposite leg or jaw.

3. The instrument according to claim 1, wherein each laser is a class 1 type laser.

4. The instrument according to claim 1, wherein each laser is designed to emit visible green light.

5. The instrument according to claim 1, wherein calipers include an electronic circuit which has a memory and at least one input key which when depressed causes the distance between the legs or jaws at that moment in time to be stored in said memory.

6. The instrument according to claim 2, wherein each laser is a class 1 type laser.

7. The instrument according to claim 2, wherein each laser is designed to emit visible green light.

8. The instrument according to claim 3, wherein each laser is designed to emit visible green light.

9. The instrument according to claim 2, wherein calipers include an electronic circuit which has a memory and at least one input key which when depressed causes the distance between the legs or jaws at that moment in time to be stored in said memory.

* * * * *